Nov. 1, 1966
C. D. GUTIERREZ
3,282,760
HEAT SEALING THERMOPLASTIC WRAPPED PACKAGES
Filed Nov. 14, 1961
2 Sheets-Sheet 1
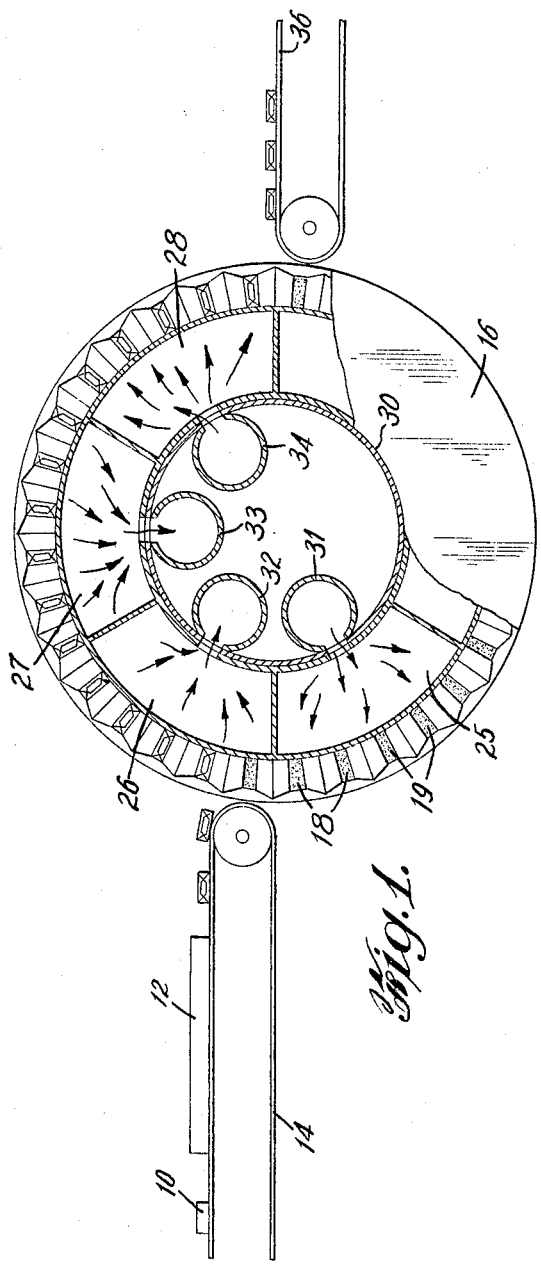
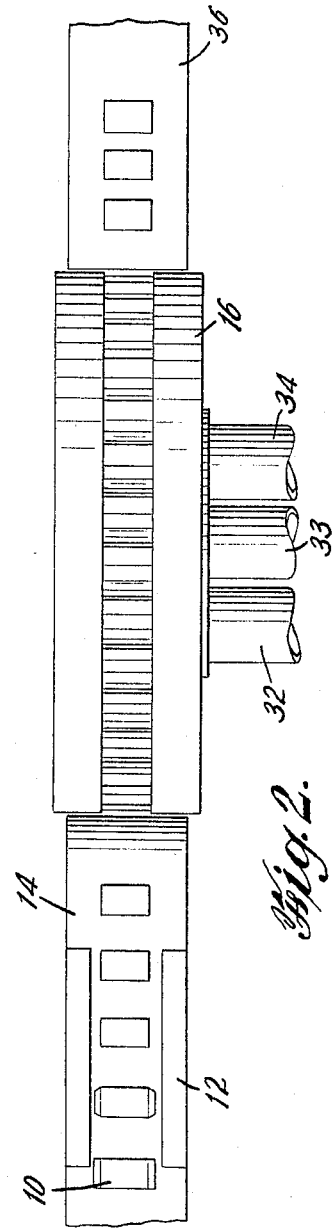
INVENTOR.
CARLOS D. GUTIERREZ
BY Richard S. Shreve Jr.
ATTORNEY

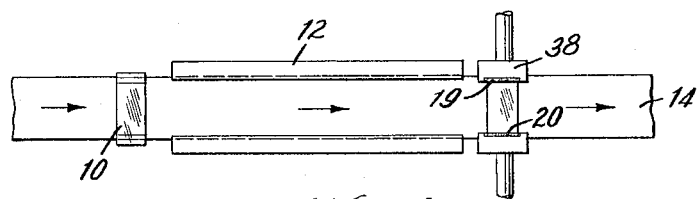
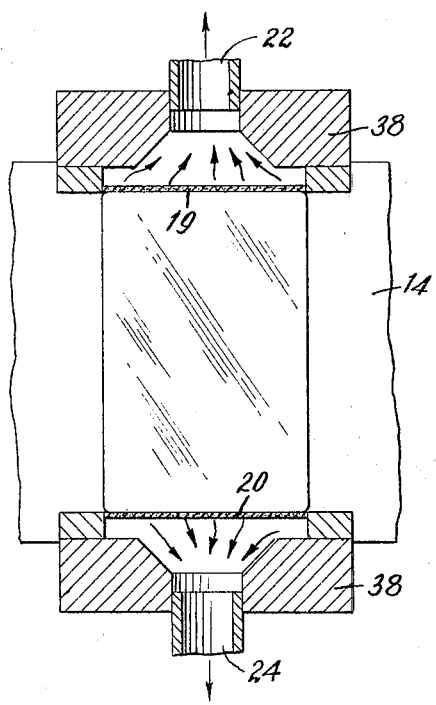
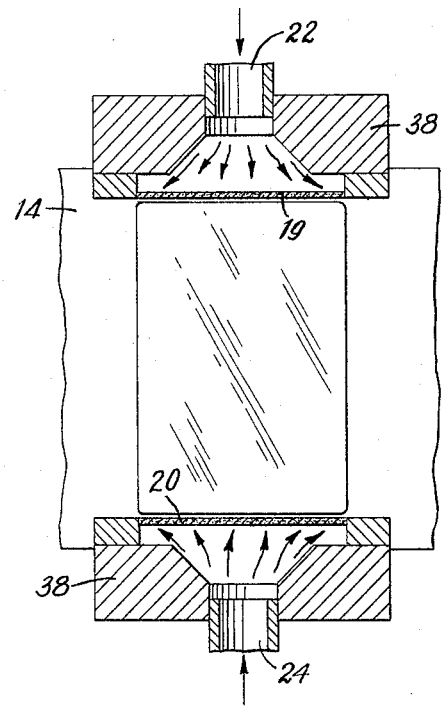
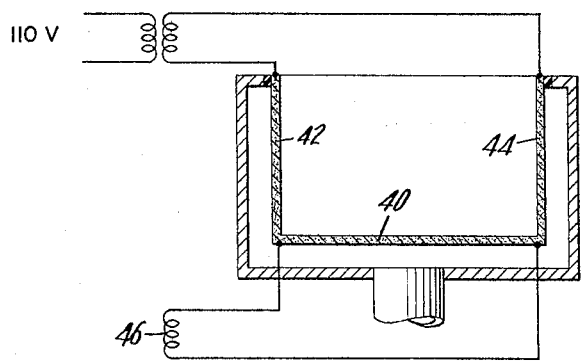

3,282,760
HEAT SEALING THERMOPLASTIC WRAPPED PACKAGES
Carlos D. Gutierrez, Middlesex, N.J., assignor to Union Carbide Corporation, a corporation of New York
Filed Nov. 14, 1961, Ser. No. 152,211
11 Claims. (Cl. 156—213)

This invention relates to heat sealing thermoplastic wrapped packages, and more particularly to heat sealing overwrapped polyolefin films on soft packs of cigarettes, candy, paper napkins and the like.

In such packaging, the appearance of the seal is of great importance. The conventional method is to carry a package by a Teflon belt past successive heating and cooling plates. This operation tends to wrinkle the film, emboss the pattern of the belt on the film, and allow the film to recover haze due to slow cooling of the belt. The pressure applied to the film is not uniform since the cigarette pack does not have uniform thickness in the sealing area. The paper is folded on the ends, thus making the surface of the paper of different levels.

The main objects of the present invention are to avoid these difficulties. Other objects are to avoid wrinkling of the film air trapped between the folded films, recovery of haze and loss of gloss. A further object is to provide a very low working pressure between heaters and pack less than that pressure which will crush the package, particularly with irregular products, such as crackers.

According to the present invention, the sealing portions of the package are contacted with one side of a porous metal plate, preferably of sintered stainless steel or sintered bronze, heated to a temperature above 200° F. and applying subatmospheric pressure to the other side of the heated porous plate.

By using a hot metal surface made up of sintered metal, a vacuum can be applied to the seal area, thus heat sealing the plastic overwrap. The sintered metal being porous, the vacuum may be applied after the heating portion of the cycle. This accomplishes three results, the forcing of the film against the heated plate, removal of trapped air from between folds, and cooling the plate. This cooling is believed to be adiabatic. Instantaneous cooling will be obtained by means of an instantaneous drop of pressure, thus preventing haze development by crystalline growth. To obtain a glossy surface on the seal, the surface of the metal plate must be polished.

In the drawings:

FIG. 1 is a vertical cross section through apparatus according to, and for carrying out the method of, the preferred embodiment of the present invention;

FIG. 2 is a plan of the apparatus shown in FIG. 1;

FIG. 3 is a diagram of a modification;

FIG. 4 is an enlarged section through one of the packages in FIG. 1 showing conditions of subatmospheric pressure;

FIG. 5 is a similar view showing differing conditions; and

FIG. 6 is a detail section of a modified heater for the plate.

Since any film overwrap on a soft pack can only be heat sealed at a pressure equal to or less than that which will not damage the package, the use of a sintered bronze plate as a heating medium will allow a maximum pressure which corresponds to that of the atmosphere or about 15 p.s.i. The sintered bronze is above 200° C., and air is pulled at a rate of 40 ft.³/hr. The pack is placed against the surface of the sintered bronze, stopping the flow of air and thus increasing the vacuum and adiabatically cooling the plate by reversing the air flow. Cold air is used to release the package away from the plate.

Since the maximum pressure of the film against the metal is equal to the absolute pressure of the system minus the pressure drop across the sintered bronze, this method can also be used by using a system of pressures higher than atmospheric. By forcing the film against the plate by means of this method, two main problems are solved. The pressure exerted is uniform throughout the entire seal area, and air trapped between the film surfaces is pulled away by the vacuum. The low percent haze is retained due to rapid cooling, and gloss remains the same, since the surface of the metal is polished.

As shown in FIGS. 1 and 2, the pack 10 is overwrapped with thermoplastic film by the folders 12, and carried by a belt 14 to a wheel 16. The periphery of the wheel is provided with a ring of consecutive outwardly open sockets 18 which receive the packs 10 in succession. Each socket 18 has porous plates 19 and 20, such as sintered metal at each end as shown in FIGS. 4 and 5, communicating with respective fluid ports 22 and 24.

Within the ring of sockets 18, consecutive groups of sockets are subtended by and communicate with segmental chambers 25, 26, 27 and 28, surrounding a stationary drum 30 about which the wheel revolves. In the position shown, the chamber 25 registers with a hot air duct 31, and passes the hot air through the porous plates 19 and 20, to heat them to a temperature of the order of 240° F. to begin the cycle.

The chamber 26 registers with a suction duct 32 which applies a vacuum of 10 in. Hg to the sockets 18 communicating therewith. The packs 10 are taken by the wheel in the sockets 18 by means of suction to the side of the pack toward the axis of the wheel, and brought into contact with the heated porous plates 19 and 20.

The chamber 27 regitsers with a duct 33 for greater suction, to apply a full vacuum of 30 in. Hg to press the film against the heated surfaces of the porous plates 19 and 20. The chamber 28 registers with a cold air duct 34 which passes the cold air in a reverse direction through the sockets to cool the seals and release the packs. The cooled sealed packs are discharged from the sockets in succession onto a delivery belt 36.

The heating plate is made of sintered metal, for example, stainless steel, silver, copper, aluminum, bronze and the like. To obtain best results, the plate must have a porosity range of 20 to 50%, preferably 30 to 40% for the sintered bronze, so as to allow a maximum pressure drop of 3–5 in. Hg when vacuum is used. The thickness of the plate must be small so as to heat and cool the plate by air in a matter of 1–3 seconds; yet, the plate has to be strong enough so it will not bend when vacuum is applied. Sintered bronze $\frac{1}{32}''$ thick and with 35% porosity has given good results.

The same principle can be applied to the system shown in FIG. 3. This system is semi-continuous in a cycle in which the pack 10 is placed before the folders 12, and moved through the folders 12 and into the heater 38. The pack stops and the heated sintered bronze plates 19 and 20 come into contact with the ends of the pack. Vacuum is first applied to seal the package and cold air releases the pack. Before the heater receives a new pack, hot air heats the plate to the required temperature of 240° F.

A modification of the above method comprises heating the sealing plate by resistance heating in which the plate acts as a heater, instead of using hot air.

Since the bronze porous plate has a very low electrical resistance, high current of the order of 300 amperes are required to heat the plate to the required temperature. Since the plate is rotating, the current had to be brushed, thus making it difficult to transfer such high current.

By the use of stainless steel, the higher resistance enables the reduction of the current required to less than 100 amperes.

The sintered stainless steel requires a current of 50 to 70 amperes for six seconds to obtain the required sealing temperature. The time limitation is dependent upon the size of the low voltage transformer used.

The most efficient sealing cycle comprises air flow during the heating of the sintered stainless steel sealing plate, then vacuum used independently, and finally cooling air also used independently.

Evaluation of the sintered stainless steel was performed with mean pore openings of 4, 12, 25 and 30 microns, establishing a range of 4 to 30 microns for good results. Mean pore openings near 30 microns are less critical since the heat can be dissipated more readily than with the smaller openings.

The present method also enables sealing all three sides of the package as shown in FIG. 6. Since the plate tends to heat up at the center, the larger side 40 tends to reach a higher temperature than the smaller sides 42 and 44. For this reason, an external shunt 46 is provided to distribute the heat so that the temperature of the smaller sides 42 and 44 equals that of the larger side 40.

What is claimed is:

1. Method for heat sealing packages overwrapped with thermoplastic films and having at least two sealing portions thereon which comprises:
    (a) heating at least two spaced porous plates each having a mean pore opening of from 4 to 30 mircons;
    (b) positioning said package between the thus heated porous plates in such a manner that the sealing portions of said package are each in close proximity to one side of each of said heated porus plates;
    (c) drawing the sealing portions of said package into direct contact with said heated porous plates by applying subatmospheric pressure to the other sides thereof thereby removing trapped air from between folds of the film, exerting uniform pressure throughout the entire seal area and heat sealing said overwrapped thermoplastic film;
    (d) passing cold air under pressure through said porous plates thereby cooling the thus sealed portions and releasing said package away from said porous plates.

2. Method of claim 1 wherein said porous plates are heated by passing hot air therethrough prior to positioning the package therebetween.

3. Method of claim 1 wherein said porous plates are heated by electrical resistance heating prior to positioning the package therebetween.

4. Method for continuously heat sealing a plurality of packages overwrapped with thermoplastic film and having at least two sealing portions thereon which comprises:
    (a) providing a plurality of consecutive sockets each having at least two spaced porous plates having a mean pore opening of from 4 to 30 microns;
    (b) establishing communication between said consecutive sockets and a first chamber containing heated air under pressure whereby heated air is passed through the porous plates in said sockets to heat said porous plates;
    (c) feeding said packages into consecutive sockets in such a manner that the sealing portions of said packages are each in close proximity to one side of each of the thus heated porous plates in said sockets;
    (d) establishing communication between said consecutive sockets and a second chamber under subatmospheric pressure thereby drawing the sealing portions of said packages into direct contact with said heated porous plates in said sockets whereby trapped air is removed from between folds of the film, uniform pressure is exerted throughout the entire seal area and said overwrapped thermoplastic film is heat sealed;
    (e) establishing communication between said consecutive sockets and a third chamber containing cold air under pressure whereby cold air is passed through the porous plates in said sockets thereby cooling the thus sealed portions of said packages and releasing said packages away from said porous plates; and
    (f) discharging the thus sealed packages from said consecutive sockets.

5. Method of claim 4 wherein said consecutive sockets are arranged on the periphery of a continuously moving wheel and said first, second and third chambers are successive chambers on the inside of said wheel and are each in communication with a portion of said consecutive sockets on said drum.

6. Apparatus for heat sealing packages overwrapped with thermoplastic film and having at least two sealing portions thereon which comprises:
    (a) at least two spaced porous plates each having a mean pore opening of from 4 to 30 microns;
    (b) means for heating said plates;
    (c) means for positioning said package between said spaced porous plates in such a manner that the sealing portions of said package are each in close proximity to one side of each of said spaced porous plates;
    (d) means for applying subatmospheric pressure to the other sides of said spaced porous plates whereby the sealing portions of said package are drawn into direct contact with said spaced porous plates thereby removing trapped air from between folds of the film, exerting uniform pressure throughout the entire seal area and heat sealing said overwrapped thermoplastic film;
    (e) means for passing cold air under pressure through said spaced porous plates thereby cooling the thus sealed portions and releasing said package from said spaced porous plates.

7. Apparatus of claim 6 wherein said heating means comprises means for passing hot air through said spaced porous plates.

8. Apparatus of claim 6 wherein said heating means comprises electrical resistance heating means.

9. Apparatus for continuously heat sealing a plurality of packages overwrapped with thermoplastic film and having at least two sealing portions thereon which comprises:
    (a) a rotatable wheel having a ring of consecutive outwardly open sockets about the periphery thereof, each of said sockets having at least two spaced porous plates having a mean pore opening of from 4 to 30 microns;
    (b) a first stationary chamber mounted inside said wheel in communication with a portion of said sockets adapted to contain heated air under pressure and to pass said heated air through the porous plates in said portion of said sockets to heat said porous plates;
    (c) means to feed said packages into said consecutive sockets, after said sockets pass over said first chamber, in such a manner that the sealing portions of said packages are each in close proximity to one side of each of the thus heated porous plates in said sockets;
    (d) a second stationary chamber under subatmospheric pressure mounted inside said wheel adjacent said first chamber adapted to draw the sealing portions of said packages into direct contact with said heated porous plates in said sockets thereby removing trapped air from between folds of the film, exerting uniform pressure throughout the entire seal area and heat sealing said overwrapped thermoplastic film;
    (e) a third stationary chamber mounted inside said wheel adjacent said second chamber adapted to contain cold air under pressure and to pass said cold air through the porous plates in said sockets to cool the thus sealed portions and to release said packages away from said porous plates;

(f) means for removing the thus sealed packages after discharge from said consecutive sockets.

10. Apparatus of claim 9 wherein said porous plates are of sintered metal.

11. Apparatus of claim 9 wherein a chamber under greater subatmospheric pressure than said second chamber is mounted inside said wheel between said second and third chambers and is adapted to maintain the sealing portions of said package in direct contact with said porous plates as said sockets move thereover.

References Cited by the Examiner

UNITED STATES PATENTS

| | | |
|---|---|---|
| 2,485,040 | 10/1949 | Cupo. |
| 2,493,439 | 1/1950 | Braund _____ 18—56 |
| 2,934,867 | 5/1960 | Vogt _____ 53—39 XR |
| 2,992,117 | 7/1961 | Rosen et al. _____ 99—173 |
| 3,084,489 | 4/1963 | Seefluth _____ 156—497 |

ALEXANDER WYMAN, *Primary Examiner.*

EARL M. BERGERT, *Examiner.*

M. E. ROGERS, W. J. VAN BALEN,
*Assistant Examiners.*